United States Patent
Barnstable et al.

(10) Patent No.: US 6,578,502 B1
(45) Date of Patent: Jun. 17, 2003

(54) SOIL WORKING APPARATUS

(76) Inventors: Derek Gilbert Barnstable, 83 Campaspe Esplanade, Echuca, Victoria 3564 (AU); Denis James Danaher, 152 Crystal Road, Torrumbarry, Victoria 3562 (AU)

( * ) Notice: Subject to any disclaimer, the term of this patent is extended or adjusted under 35 U.S.C. 154(b) by 0 days.

(21) Appl. No.: 09/805,775
(22) PCT Filed: Sep. 17, 1999
(86) PCT No.: PCT/AU99/00790
§ 371 (c)(1), (2), (4) Date: May 21, 2001
(87) PCT Pub. No.: WO00/16605
PCT Pub. Date: Mar. 30, 2000

(30) Foreign Application Priority Data

Sep. 18, 1999 (AU) .............................................. PP6034

(51) Int. Cl.[7] .................................................. A01C 5/06
(52) U.S. Cl. ...................................... 111/164; 111/195
(58) Field of Search ................................. 111/164, 163, 111/149, 53, 54, 52, 59, 190–195, 926; 172/538

(56) References Cited

U.S. PATENT DOCUMENTS

| | | | | |
|---|---|---|---|---|
| 4,275,671 A | * | 6/1981 | Baker | ........................... 111/85 |
| 5,398,625 A | * | 3/1995 | Johnson et al. | ............. 111/189 |
| 5,494,339 A | * | 2/1996 | Johnson et al. | .......... 301/105.1 |
| 5,595,130 A | * | 1/1997 | Baugher et al. | .............. 111/52 |
| 5,619,939 A | * | 4/1997 | Herman et al. | ............. 111/163 |
| 5,676,429 A | * | 10/1997 | Johnson et al. | ............ 301/64.7 |
| 5,802,995 A | * | 9/1998 | Baugher et al. | .............. 111/52 |

FOREIGN PATENT DOCUMENTS

| | | | |
|---|---|---|---|
| AU | 206992 | | 3/1957 |
| AU | 16486 | | 10/1995 |
| AU | 50535 | | 11/1996 |
| EP | 0117745 | | 9/1984 |
| GB | 2001513 A | * | 2/1979 |
| WO | 93/17545 | | 9/1993 |
| WO | 98/31210 | | 7/1998 |

* cited by examiner

*Primary Examiner*—Christopher J. Novosad
(74) *Attorney, Agent, or Firm*—Dennison, Schultz & Dougherty

(57) ABSTRACT

A soil working apparatus including at least one rotatable soil working members (52, 54) for disturbing the soil in the direction of travel of the apparatus, the rotatable soil working members (52, 54) being obliquely passing through and beneath the surface of the soil, and at least one press wheel (80, 82) positioned beside and at least partially behind each of the at least one rotatable soil working members for pressing down the soil disturbed by the rotatable soil working members, each press wheel corresponding to at least one rotatable soil working members.

23 Claims, 15 Drawing Sheets

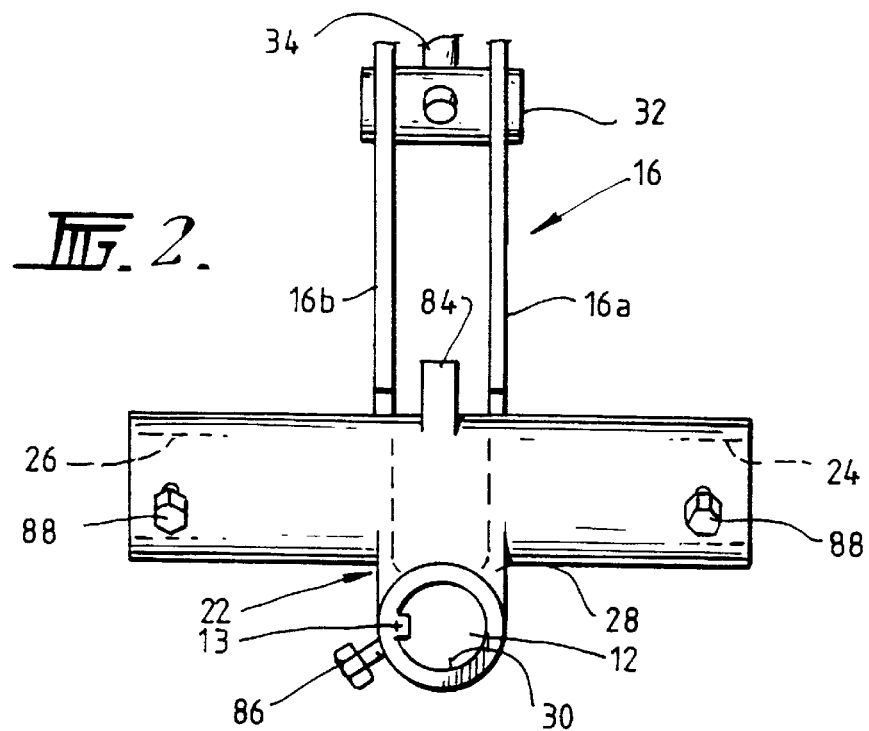
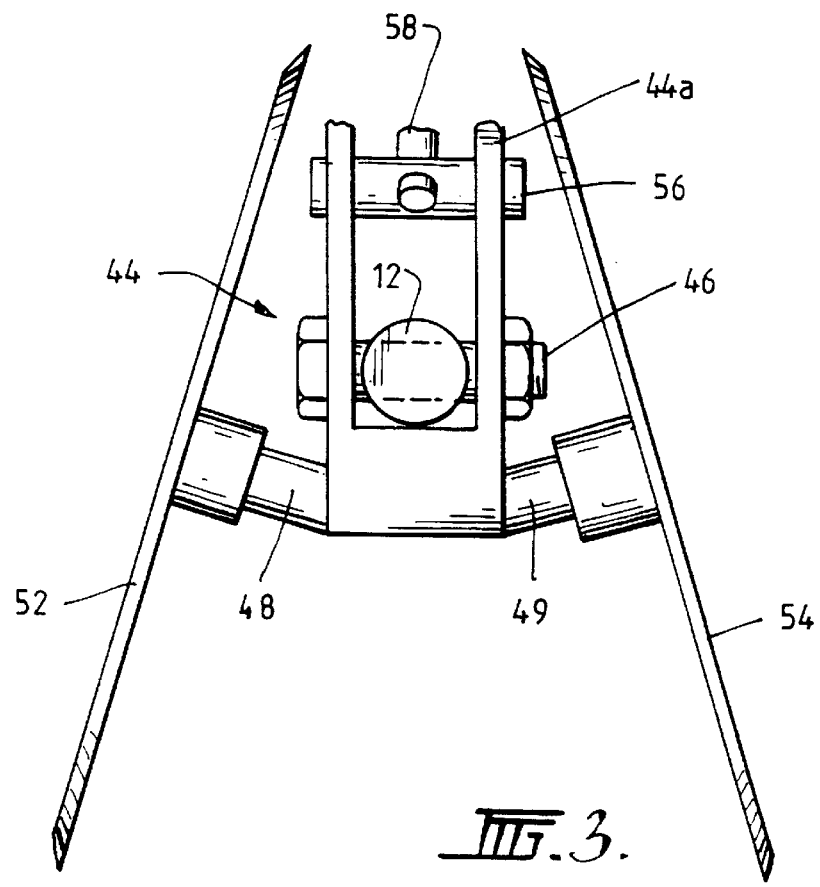

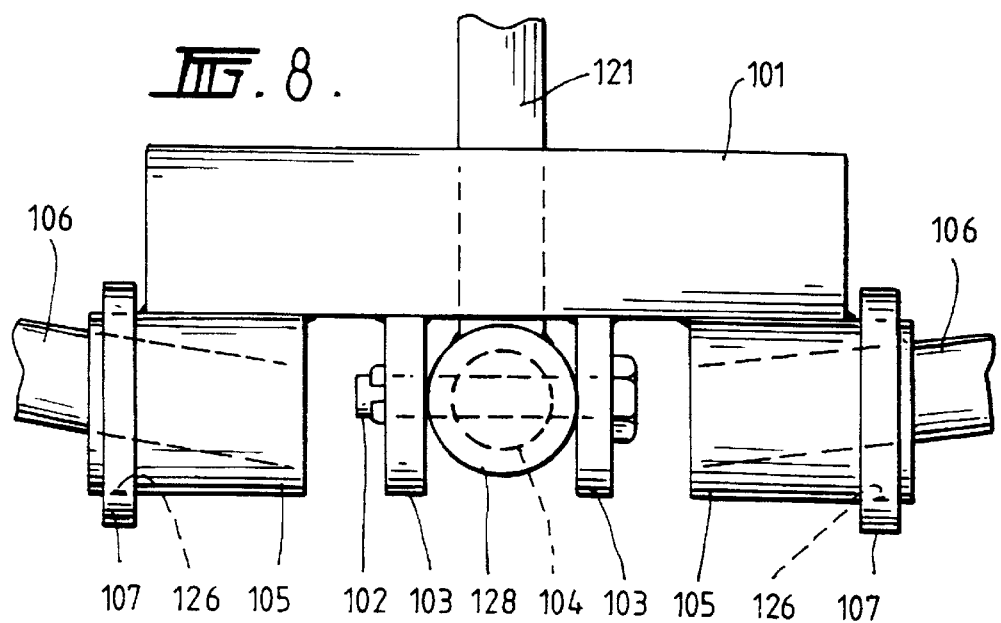
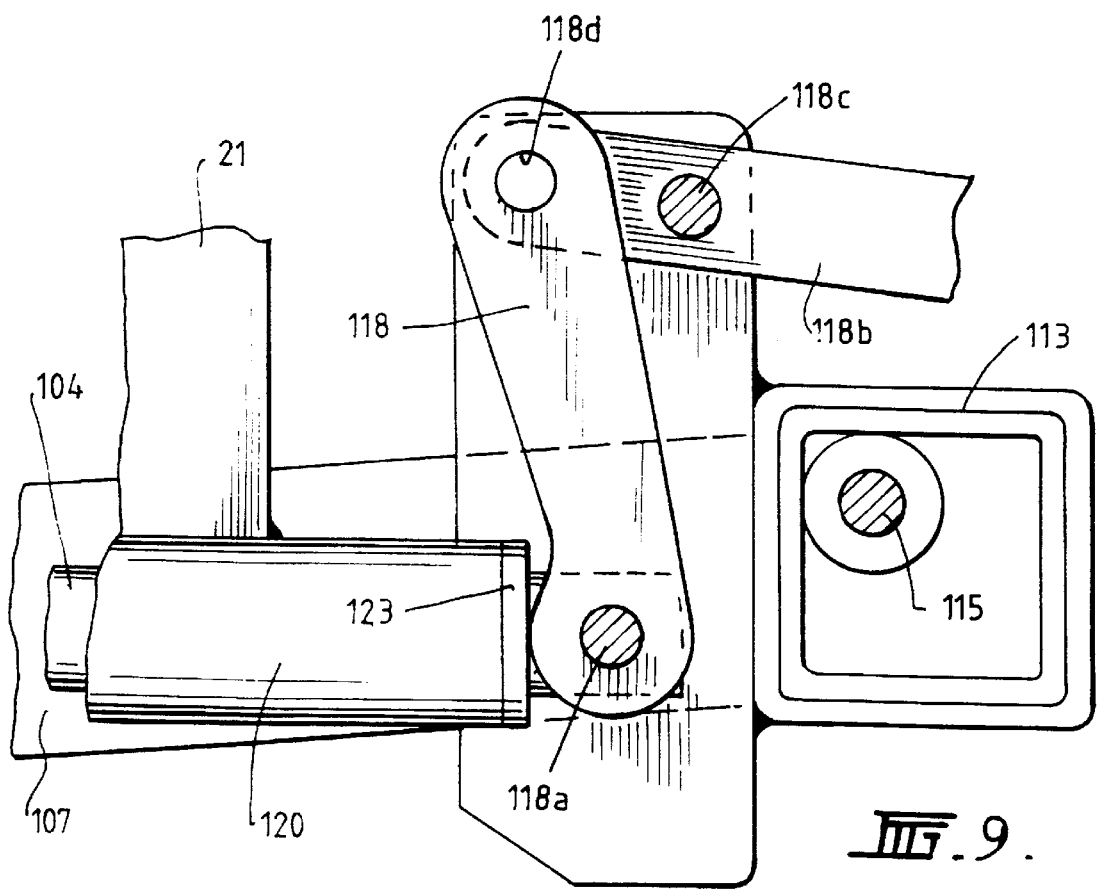

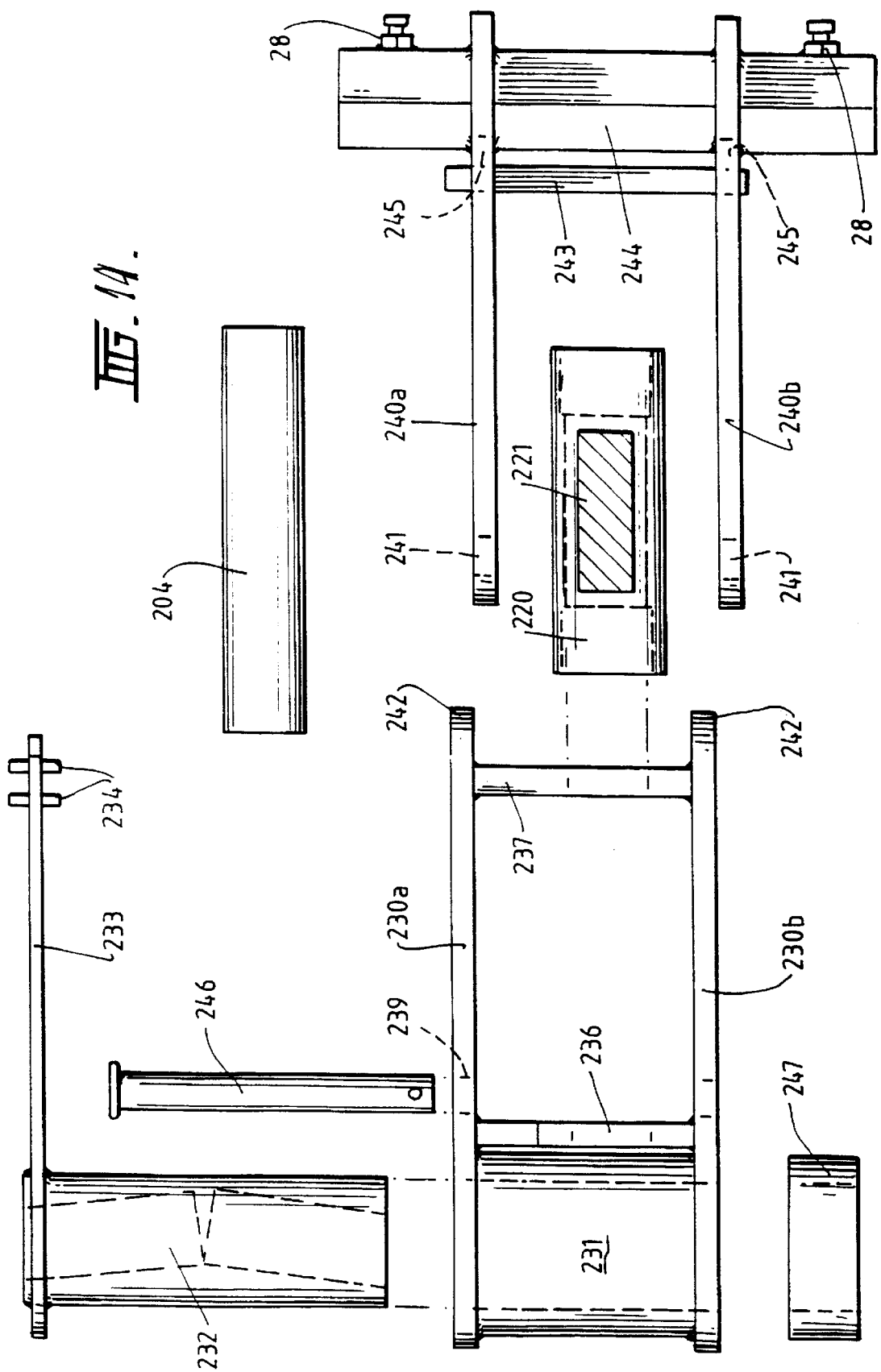

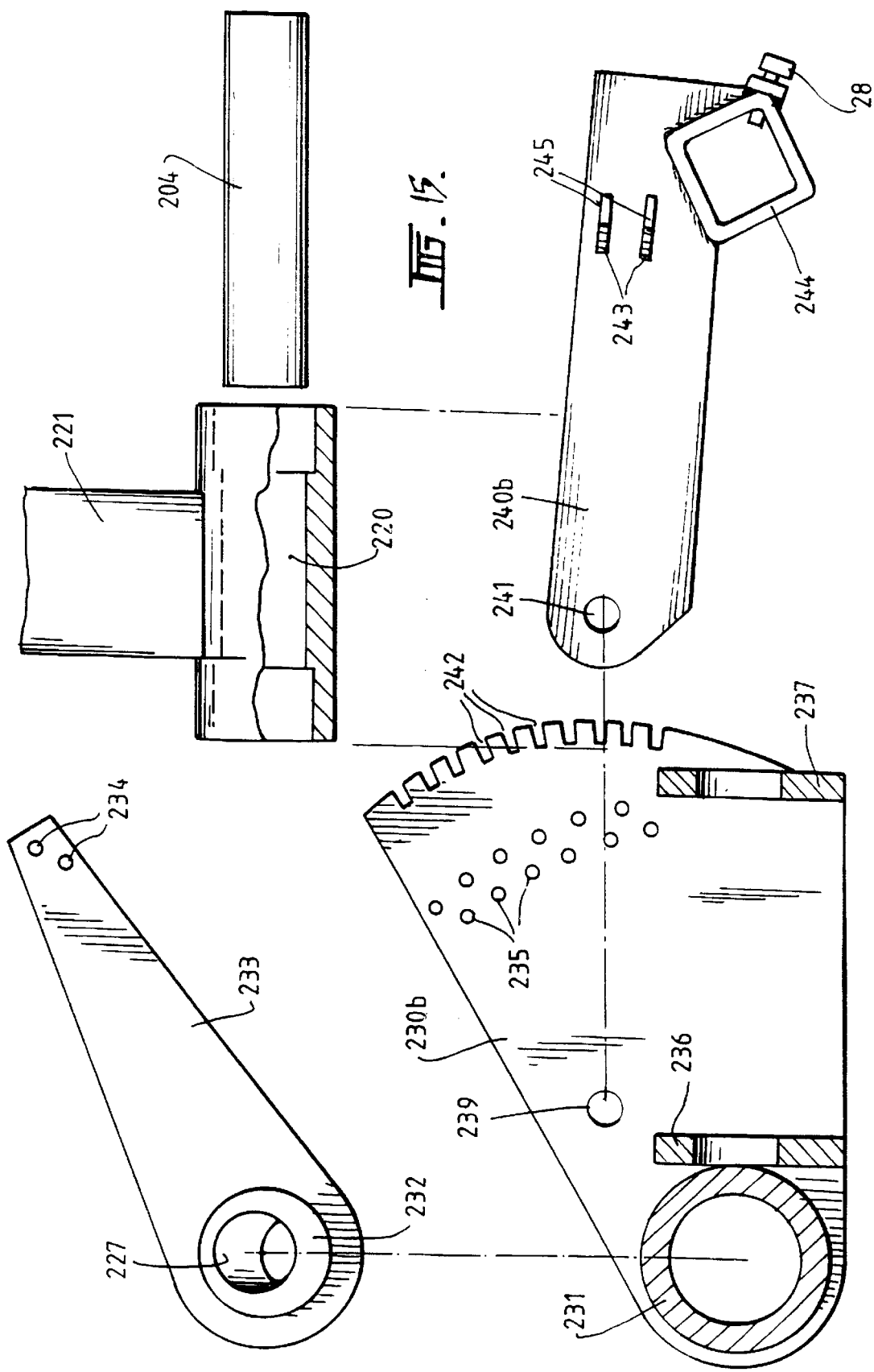

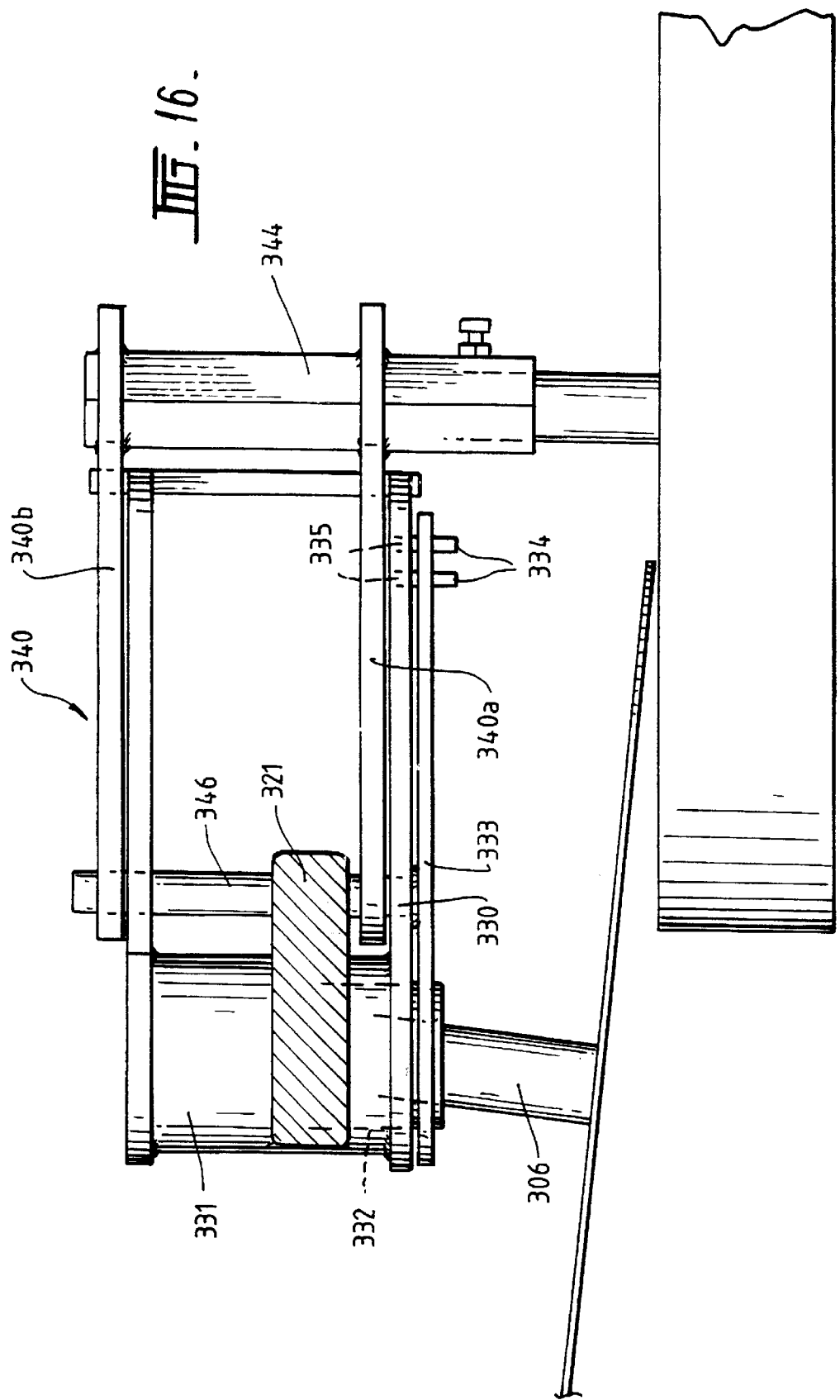

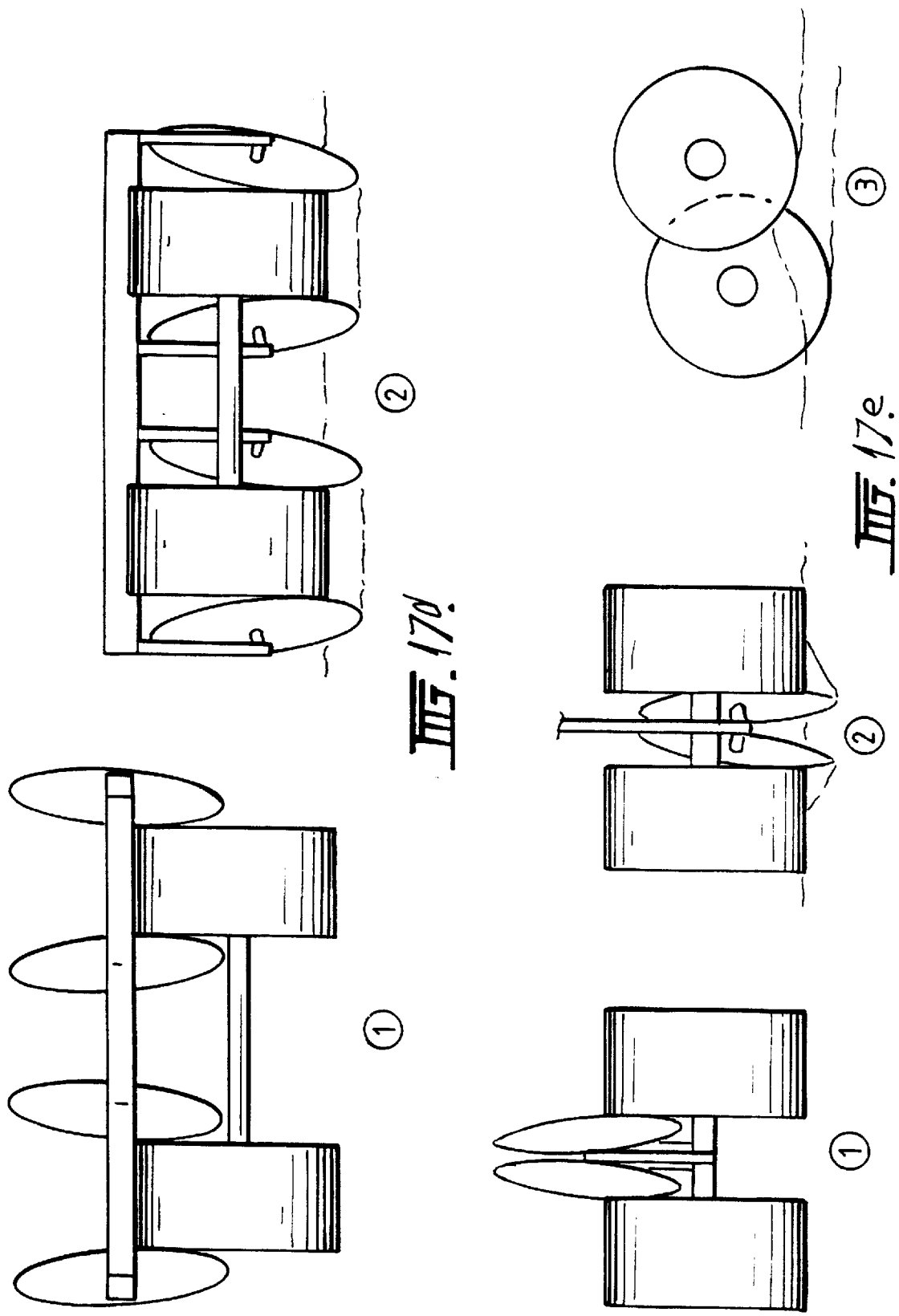

SOIL WORKING APPARATUS

The present invention relates to a soil working apparatus. The present invention is particularly suitable for use as a planting apparatus or a seeding apparatus to produce a definite seedbed tilth. This ensures positive seed soil contact, fast and even germination and excellent primary root growth for rapid plant establishment.

Planting or seeding of crops is traditionally carried out by ploughing a field and subsequently planting or seeding the field. Planting or seeding apparatus include soil working tools, such as points, discs or coulters, that disturb the soil. Seed or vegetative matter is dropped into the disturbed soil a short distance behind the soil working tool. In cases where rotatable soil working tools, such as discs or coulters, are used, a number of discs or coulters are mounted on a common axle. The discs or coulters are also mounted in an essentially vertical plane but at an angle to the direction of travel of the planting or seeding apparatus. The discs or coulters all have essentially the same orientation.

It is an object of the present invention to provide an improved soil working apparatus.

In one aspect, the present invention provides a soil working apparatus having a sub-unit including at least one rotatable soil working means for disturbing soil in the direction of travel of said apparatus, said rotatable soil working means being oriented for obliquely passing through and beneath the surface of the soil, a sub assembly including a mounting beam mounted for rotation within said sub-unit having at least one oblique axle mounting for receiving an axle of said soil working means, said axle extending into said mounting at an angle offset from the direction of rotation of the longitudinal axis of the mounting beam, and at least one press wheel positioned beside and at least partially behind each of said at least one rotatable soil working means for pressing down the soil disturbed by said rotatable soil working means, each press wheel corresponding to at least one rotatable soil working means whereby rotation of said oblique axle mounting beam within said sub-unit changes the orientation of said soil working means relative to its respective press wheel.

In a preferred form, the soil working apparatus traverses a path across the surface of the soil in the direction of travel of the apparatus. Since the press wheel travels across the surface of the soil, the depth and angle of the rotatable soil working means relative to the surface of the soil may be set by adjustment of the position of the soil working means relative to the press wheel.

By positioning the press wheel beside and partially behind the soil working means, the press wheel is able to carry out three separate functions in its synchronous operation with the soil working means. These functions include, (1) the ability to catch and control the disturbed soil as it rises with the trailing edge of the soil working means exiting the soil, (2) the ability to establish the operating depth of the soil working means, and (3) gently pressing the disturbed soil back over any planted seeds without overpressing or overcompaction of the soil.

It is preferable that a portion of the soil working means disturbs soil beneath at least a portion of the path of the press wheel during its rotation. It is desirable that the soil working means not pass beneath the full width of the path of the press wheel.

Through the combination of the soil working means and the press wheel, the soil working apparatus is able to disturb the soil to allow seeds to be planted with very little or no appreciable mixing of dry surface soil and moist subsurface soil. This maintains the moisture in the soil and provides the most optimal conditions for plant germination from seeds.

In another aspect, the present invention provides a soil working apparatus having a sub unit including a plurality of rotatable soil working means, each of the rotatable soil working means being oriented in an oblique plane and wherein one of the rotatable soil working means is in an opposed orientation to another of the rotatable soil working means, a mounting beam mounted for rotation within said sub unit having a plurality of oblique axle mountings for receiving an axle of each said soil working means, each axle extending into said mounting at an angle off set from the direction of rotation of the longitudinal axis of the mounting beam whereby rotation of said soil working means relative to its respective press wheel and at least one press wheel positioned at least partially behind the rotatable soil working means for pressing down soil disturbed by the rotatable soil working means.

Preferably, the rotatable soil working means are arranged in opposed pairs although single rotatable soil working means in combination with paired soil working means are within the scope of the invention. In either case, the oblique plane of the soil working means is angled towards the press wheel. In this way, the disturbed soil will be on the press wheel side of the soil working means.

As in the case of a single soil working means and press wheel, when at least one press wheel is used in combination with multiple soil working means, the press wheel:

(i) catches and controls the disturbed soil as it rises with the trailing edge of the soil working means, (ii) establishes the working depth of the soil working means, and (iii) gently presses the disturbed soil back over any planted seeds without overpressing or overcompaction of the soil.

The apparatus may further comprise connection means for connecting said apparatus to a superstructure or a tool carrying assembly. The connection means is preferably a support or a plurality of supports and a single support is usually sufficient for each sub unit. The support may be inserted into or received by a standard support-receiving box that is part of an assembly that is ultimately connected to a tractor or other towing vehicle. Other connection means may be used. It will be appreciated that the connection means will normally be held in a fixed orientation and preferably substantially vertical, when it is connected to the assembly that is connected to the tractor or other towing machine.

The apparatus preferably further comprises a sub-frame for connecting a number of sub-units together. The sub-frame may be connected to a superstructure or a tool carrying assembly by connection means.

Preferably, each sub-unit has two rotatable soil working means. The rotatable soil working means are preferably in an opposed orientation such that one of the rotatable soil working means is essentially a mirror image of the other.

It can be seen that the present invention may provide a soil working apparatus or a sub-unit for a soil working apparatus. For ease of fitting, modularity and to open up the possibility of retrofitting, the present invention is preferably in the form of a sub-unit for a soil working apparatus. For convenience, the invention will hereinafter be described with reference to the embodiment of the invention as being a sub-unit. However, it will be understood that the invention is not limited to that particular embodiment. Indeed, the present invention extends to encompass soil working apparatus manufactured as an integral unit and having the features described herein.

In one preferred embodiment the rotatable soil working means are preferably mounted on a mounting beam that is preferably connected to a longitudinal member. By "longitudinal member", it is meant a member that extends substantially parallel to the direction of travel of the apparatus in use. The longitudinal member is preferably a shaft extending generally along a line of travel of the apparatus of the present invention. Preferably, the sub-unit of the present invention is provided with two rotatable soil working means and both of the rotatable soil working means are connected to the mounting beam. Even more preferably, each of the rotatable soil working means are fixed to a stub axle, with each stub axle fixed to and projecting from the mounting beam. The stub axles may extend at an angle offset from the vertical plane and at an angle to the direction of travel in order to provide the desired orientation of the rotatable soil working means. The angle of the stub axles and thus the soil working means to the direction of travel is adjustable depending on the orientation desired.

The mounting beam that carries the rotatable soil working means is preferably pivotally connected to the longitudinal member about an axis perpendicular to the longitudinal member. The sub-unit may further include a first adjustment means for adjusting the position of the mounting around the pivotal connection point of the mounting beam to the longitudinal member. By adjusting the first adjustment means, the gap or opening between the two rotatable soil working means at soil entry level may be increased or decreased and the angle of the rotatable soil working means to the direction of travel may be increased or decreased. This enables control and adjustment of soil tilth and width of the tilled zone.

It is preferred that each of the rotatable soil working means is provided with its own press-wheel. Thus, a sub-unit having two rotatable soil working means may have a press-wheel for each soil working means or a single press wheel with a rotatable soil working means arranged on either side of the press wheel cutting towards that press wheel. The press wheels are usually located at least partially behind and beside their corresponding rotatable soil working means. The press wheels may be carried by a press wheel beam connected to the longitudinal member.

The sub-units of the present invention preferably will fit into existing parallelogram controlled assemblies which enables retrofitting of the sub-units to existing machinery. Alternatively, the present invention may be manufactured as a complete apparatus or as a stand alone unit.

The longitudinal member is preferably arranged such that, in use, it can rotate about its longitudinal axis. This would allow the press wheels and rotatable soil working means to rotate about the longitudinal axis of the longitudinal member. Thus, if one of the rotatable soil working means encounters an obstacle or runs across uneven ground, it can lift upwardly by rotating around the longitudinal axis of the longitudinal member. This feature assists in obtaining constant depth working of the soil and minimizes the chance of breakage due to hitting rocks, stumps and the like.

The apparatus of the present invention is preferably used as a seeding apparatus or planting apparatus. Accordingly, the apparatus may further comprise supply means for supplying seed, vegetative matter and/or other beneficial agents to soil that has been disturbed by the rotatable soil working means. Preferably, the supply means comprises one or more tubes having an outlet located a short distance above the level of soil that has been disturbed by the rotatable soil working means or even extending into the momentary void in the soil created by passage of the soil working rotatable means therethrough. Seed and fertilizer tubes may extend below the original surface, but seed and fertilizer tubes may only operate on the undisturbed side of the coulters.

It will be appreciated that orientation of the rotatable soil working means in an oblique plane and at an angle to the direction of travel of the apparatus will cause the soil that has been disturbed by the rotatable soil working means to be moved upwardly and laterally by the rotatable soil working means by always towards the press wheel. This will create a momentary void in the soil in the vicinity of a rear part of the rotatable soil working means and the supply means is preferably located such that it supplies seed, vegetative matter or other beneficial agents to that momentary void.

The provision of a press wheel associated with preferably each of the rotatable soil working means ensures that the rotatable soil working means do not throw the worked soil any appreciable distance. Moreover, the press wheels not only act to control the depth of working of the rotatable soil working means, but they also act to catch and press down the disturbed soil onto the seed or other vegetative matter that has been supplied to the worked soil. This assists in germination because of better seed/soil contact.

In some circumstances, the press wheel may be moved further rearward relative to the soil working means. In this way some of the soil is moved to the side, creating a furrow along which the trailing press wheel travels. As seeds can then be planted at the bottom of the furrow in front of the trailing preferably narrower press wheel, this arrangement has the advantage of planting seeds closer to the soil moisture level without increasing the depth of soil covering the seedlings after germination.

It should be noted that even though the press wheel is moved further rearward, the path of the press wheel is still beside the rotatable soil working means and so the press wheel is still considered to be behind and beside the rotatable soil working means.

In another embodiment, the apparatus may include a chassis means, with said sub unit including said rotatable soil working means and said press wheels being attached, either directly or indirectly, to the chassis means. The chassis means may be adjustable in a transverse direction in order to allow the width of the apparatus to be adjusted. The rotatable soil working means are mounted to a sub-unit and the sub-unit may be mounted to the chassis means. Preferably, each rotatable soil working means is mounted to its own sub-unit. The sub-unit or sub-units are preferably pivotally mounted to the chassis means in a manner similar to that described above. This allows for adjustment of the angle of the rotatable soil working means relative to the corresponding press wheel or wheels by rotational adjustment of the mounting beam with the sub-units.

It is also preferred that the sub-unit including the rotatable soil working means and the press wheels can rotate in a plane that is transverse to the direction of travel of the apparatus in order to allow the rotatable soil working means and the press wheels to move generally upwardly or downwardly in the event that an obstruction or uneven ground is encountered. In this regard, the movement of the rotatable soil working means and press wheels is similar to the oscillations of the rotatable soil working means and the press wheels in a previously described embodiment.

If an adjustable chassis means is provided, the adjustable chassis may include a plurality of generally longitudinally extending members interconnected by at least one transverse connecting member, said at least one transverse connecting member being of adjustable length. Preferably, the at least one transverse connecting member is a telescopic member.

The invention will now be described with reference to preferred embodiments of a soil working apparatus having one or two rotatable soil working means in association with a corresponding press wheel.

Further features, objects and advantages of the present will become more apparent from the following description of the preferred embodiment and accompanying drawings, in which:

FIG. 2 is a rear-view of the apparatus of FIG. 1 showing detail of the press wheel beam and stop-member;

FIG. 3 is a schematic front elevation of the apparatus of FIG. 1 showing the arrangement of the sub-assembly, stub axles and coulters. In FIG. 3, the coulters will splay outwardly from front to rear but this is not drawn (for improved clarity);

In FIG. 4, the coulters will splay outwardly from top to bottom, but this is not drawn (for improved clarity);

Figure 7:
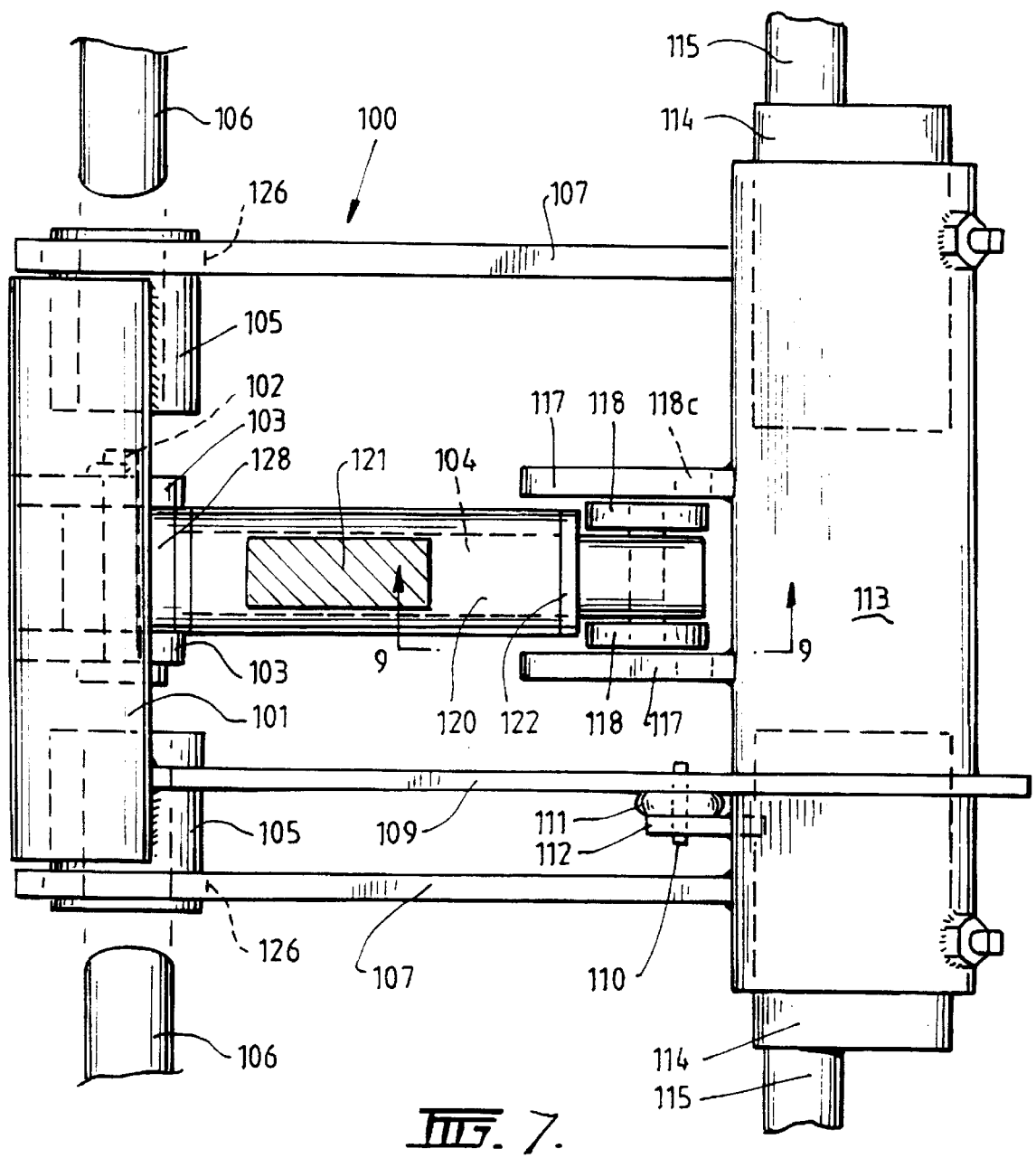
Figure 10:
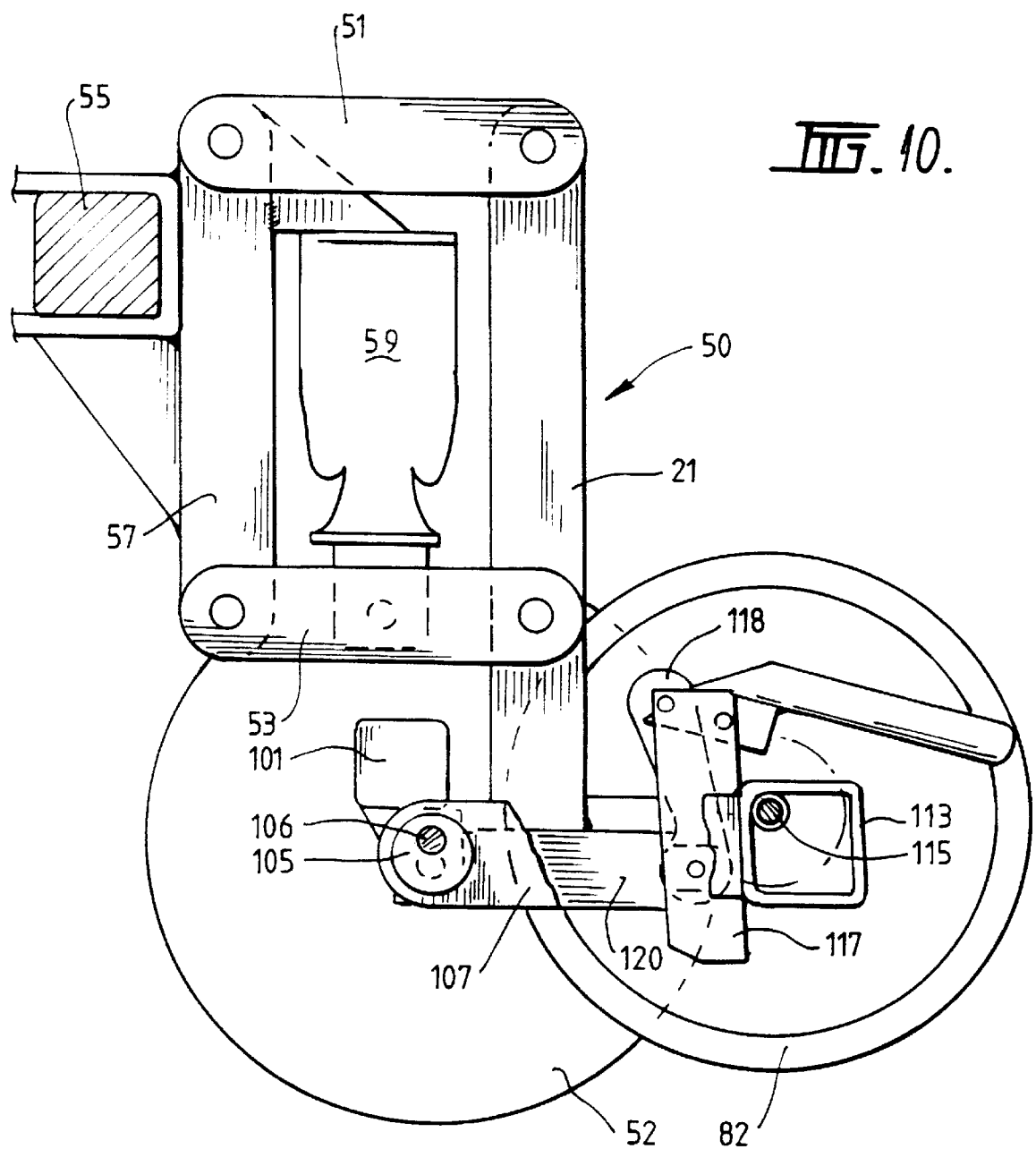
Figure 11:
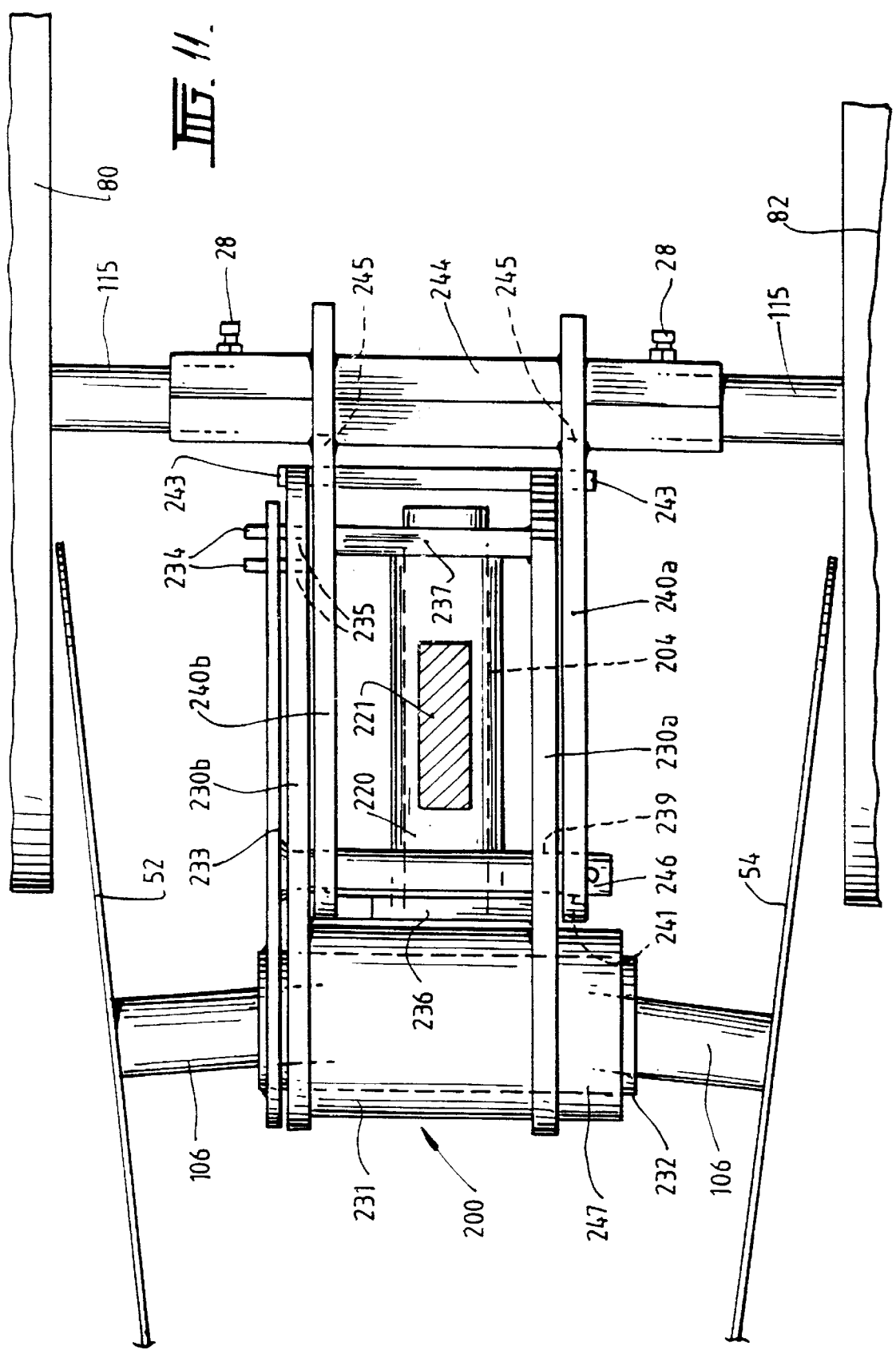
Figure 12:
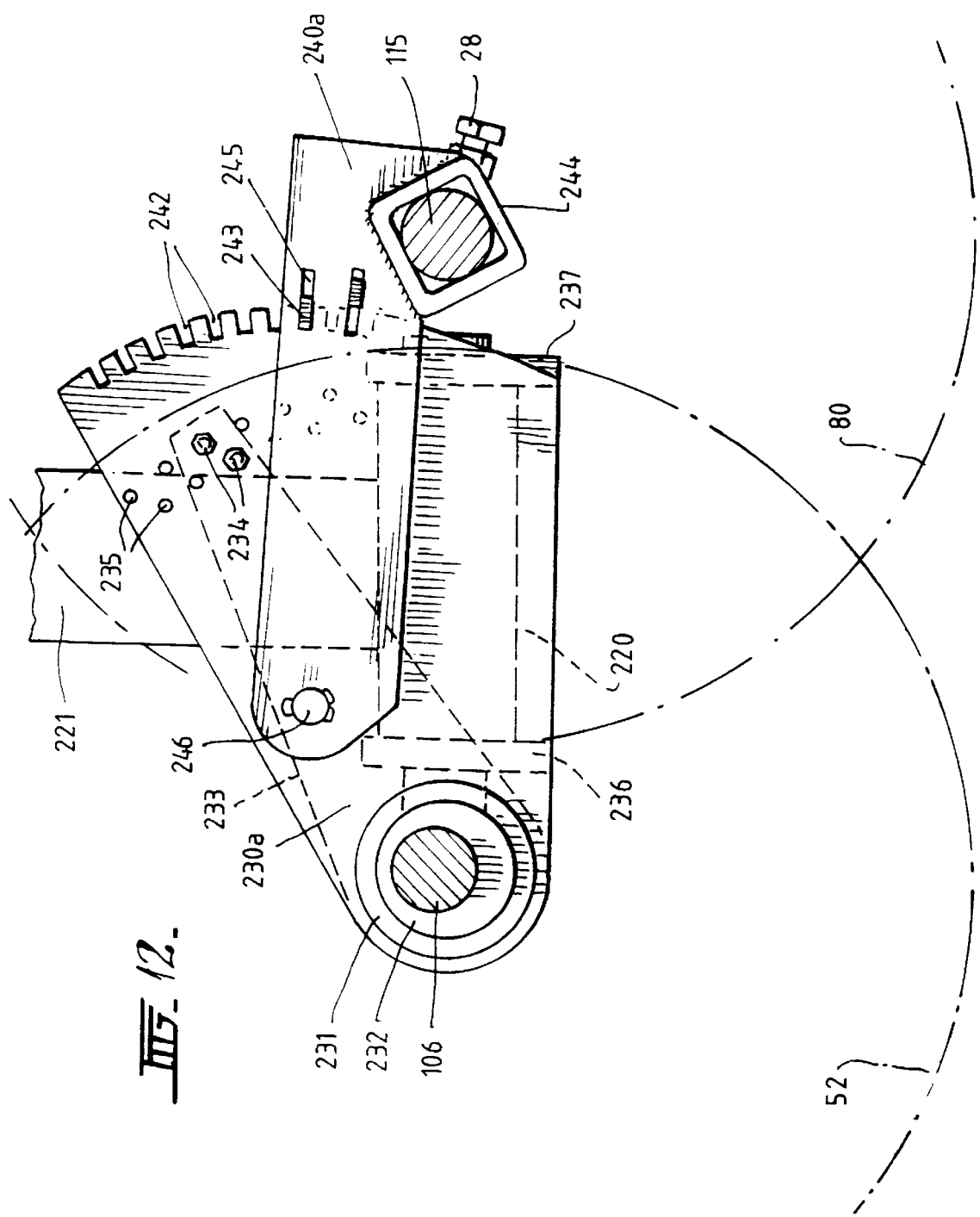
Figure 13:
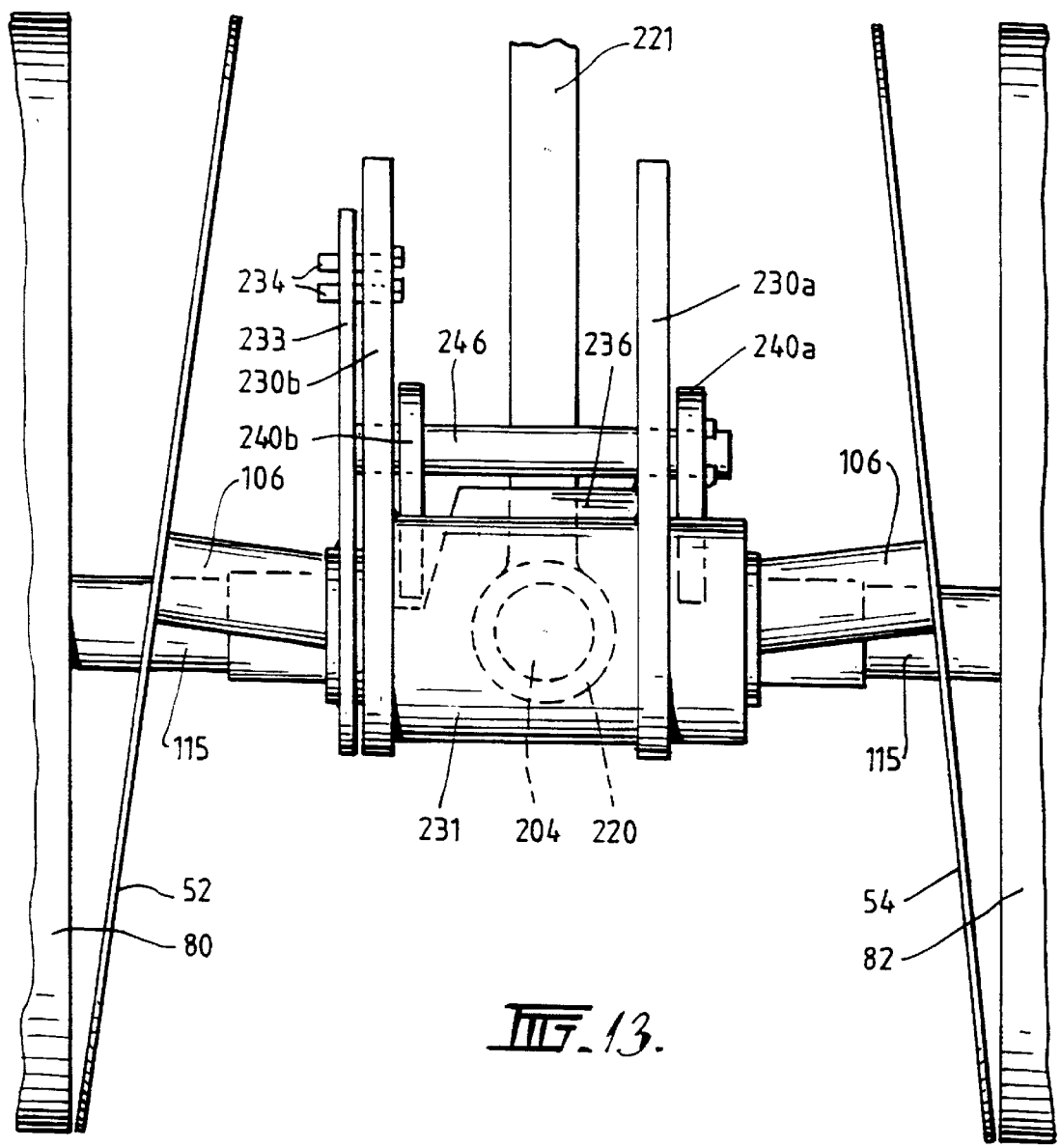

FIG. 7 shows a plan view of a second embodiment of the present invention in which the soil working means and press wheels are now shown, FIG. 8 is a front view of the apparatus shown in FIG. 7, FIG. 9 is a sectional view of part of rear depth adjustment through line 9—9 of FIG. 7, FIG. 10 is a side view of a parallelogram superstructure attachment of the present invention illustrated with the embodiment of FIG. 7, FIG. 11 is a plan view of a third embodiment of the invention FIG. 12 is a schematic side view of the embodiment of FIG. 11 with the soil working means and press wheels removed but superimposed to illustrate their normal position, FIG. 13 is a front view of the embodiment shown in FIG. 11, FIG. 14 is a schematic plan view showing the elements of the sub-unit of FIG. 11 without the soil working means and press wheels, FIG. 15 is a schematic side view of the elements of the sub-unit of FIG. 11, FIG. 16 is a schematic plan view of a third embodiment of the present invention illustrating a single press wheel and single coulter arrangement, and FIGS. 17(a) to FIG. 17(e) are alternative arrangements between the soil working means and press wheels which fall within the scope of the invention.

Figure 1:
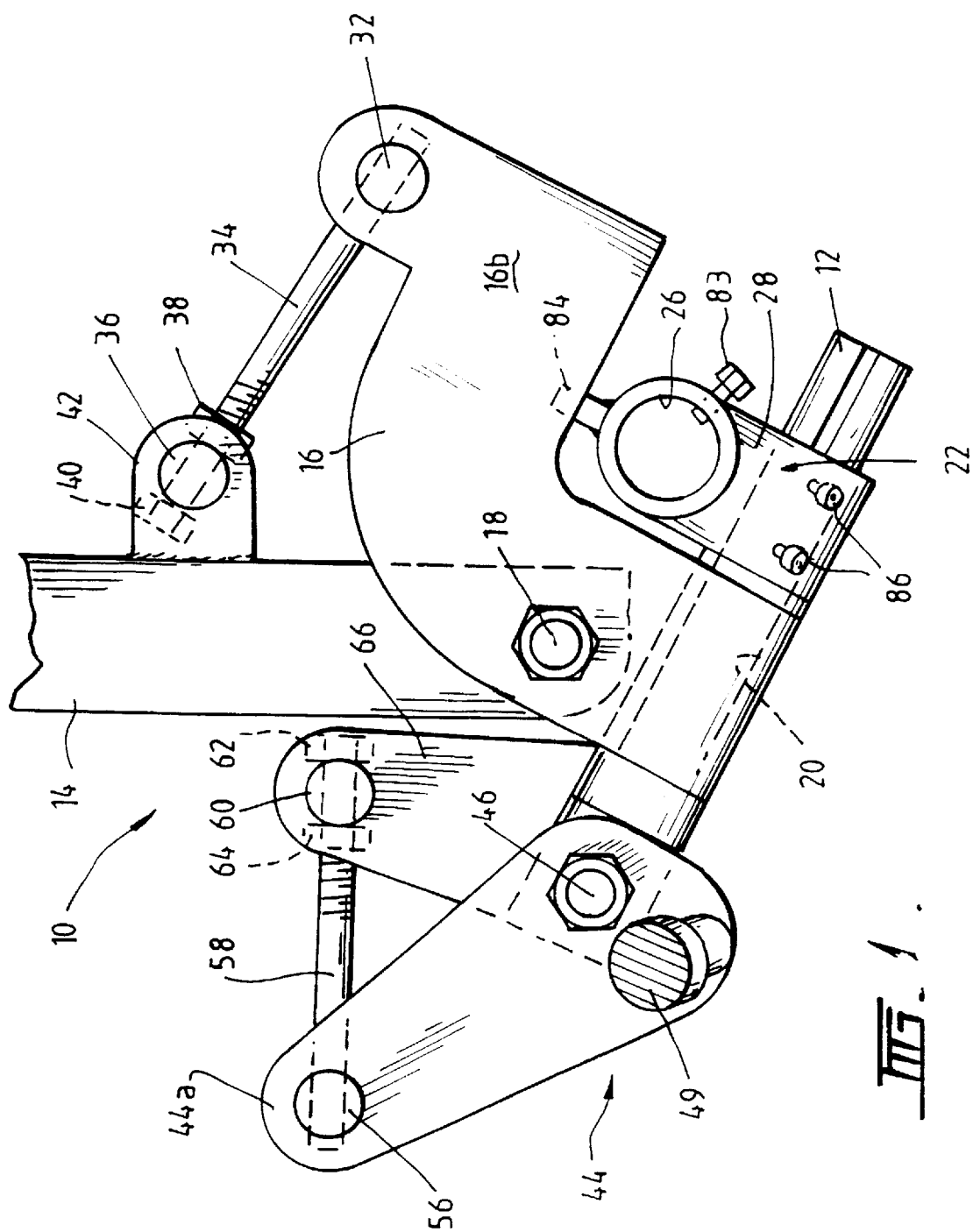
FIG. 1 is a side elevation of a sub-unit in accordance with the invention with the press wheels and coulters removed for clarity.

FIG. 1 shows a side view of an embodiment of the present invention with the press wheels and coulters removed for clarity. The embodiment shows an apparatus 10 comprises a longitudinal shaft 12. A tine 14 is pivotally connected to an intermediate member 16 by bolt/pin 18. Intermediate member 16 has an opening 20 formed in a lower part thereof and shaft 12 passes through opening 20 to thereby connect intermediate member 16 to shaft 12. Shaft 12 and opening 20 are configured such that the shaft 12 can rotate inside opening 20. For example, the inner part of opening 20 may be provided with a nylon bushing, roller bearings or other low friction surface. Affixed to a rear part of shaft 12 is press wheel beam 22. Press wheel beam 22 has openings 24, 26 for receiving press wheels Press wheel beam 22 includes an extended housing 28 having an opening 30 for receiving longitudinal shaft 12. (As shown in FIG. 2). A key way 13 is formed in a rear portion of longitudinal shaft 12 and this key way is engaged by a keying member (not shown) formed in the opening 30 of the lower part of extended housing 28 of the press wheel beam. This ensures that the press wheel beam 22 is securely fixed to longitudinal shaft 12.

As best seen in FIG. 2, intermediate member 16 includes two upwardly extending members 16(a), 16(b). A pin or bolt 32 extends through a hole formed in the upper part of upwardly extending part 16(a), 16(b) of intermediate member 16. Bolt 32 provides a pivotal connection for an adjustable screw thread 34. As shown in FIG. 1, the other end of screw thread 34 is received through bolt or pin 36 and is held in place by locating nuts 38, 40. Pin 36 is affixed through a hole in bracket 42 that is welded or otherwise fixedly connected to support 14. As will be appreciated from FIG. 1, adjusting screw 34 will cause intermediate member 16 to rotate about pivot point 18 and this will alter the angle between tine 14 and longitudinal shaft 12. This will have the effect of altering the depth of working of the coulters.

At the forward end of longitudinal shaft 12, a sub-assembly 44 is pivotally mounted about bolt or pin 46 to longitudinal shaft 12. A front elevational view of this sub-assembly is shown in FIG. 3. Sub-assembly 44 may also be described as a sub-frame. Sub-assembly 44 carries stub axles 48, 49. As can be seen from FIGS. 1 and 3, sub-axles 48, 49 are mounted such that they have an angle to both vertical and horizontal. Stub axle 48 carries coulter 52 whilst stub axle 49 carries coulter 54. Coulters 52, 54 are preferably plain coulters. As can best be seen from FIG. 5, coulters 52, 54 are oriented such that they also have an angle to both horizontal and vertical planes. As a result, when the coulters are working the soil, the rearmost part of the coulter that contacts the soil is located outwardly of the front most part of the coulter that is working the soil. As a result, passage of the coulter through the soil causes the soil to be pushed outwardly and upwardly, which creates a momentary void behind the coulter. Seed and any other beneficial agents are dropped into this momentary void. The press wheel positioned partially behind and on the disturbed soil side of the coulter catches and controls the disturbed soil as it rises with the trailing edge of the soil working means. Once the coulter has passed through a particular part of the soil, the press wheel operating synchronously with the coulter pushes the disturbed soil back into the void to cover the seed and other beneficial agents and to press the soil down without overpressing or overcompacting the soil.

The upper part 44(a) of sub-assembly 44 is pivotally connected by a pin or bolt 56 to a screw adjustor 58. The other end of screw adjustor 58 is connected by pin or bolt 60 and nuts 62, 64 to a bracket 66 mounted on longitudinal shaft 12. As can be appreciated, bracket 66 is fixedly mounted to longitudinal shaft 12. This arrangement allows adjustment of the position of sub-assembly 44 relative to longitudinal shaft 12. In particular, rotation of screw adjustor 58 will cause sub-assembly 44 to rotate about pin or bolt 46 to change the orientation of sub-assembly 44 relative to longitudinal shaft 12. As the sub-assembly 44 rotates about pin or bolt 46, the angle to the direction of travel of coulters 52, 54 and the distance between the coulters 52, 54 at the soil surface level will also change. This allows for adjustment of the coulters to account for, for example, the planting of different crops or the working of different soil types.

Figure 4:
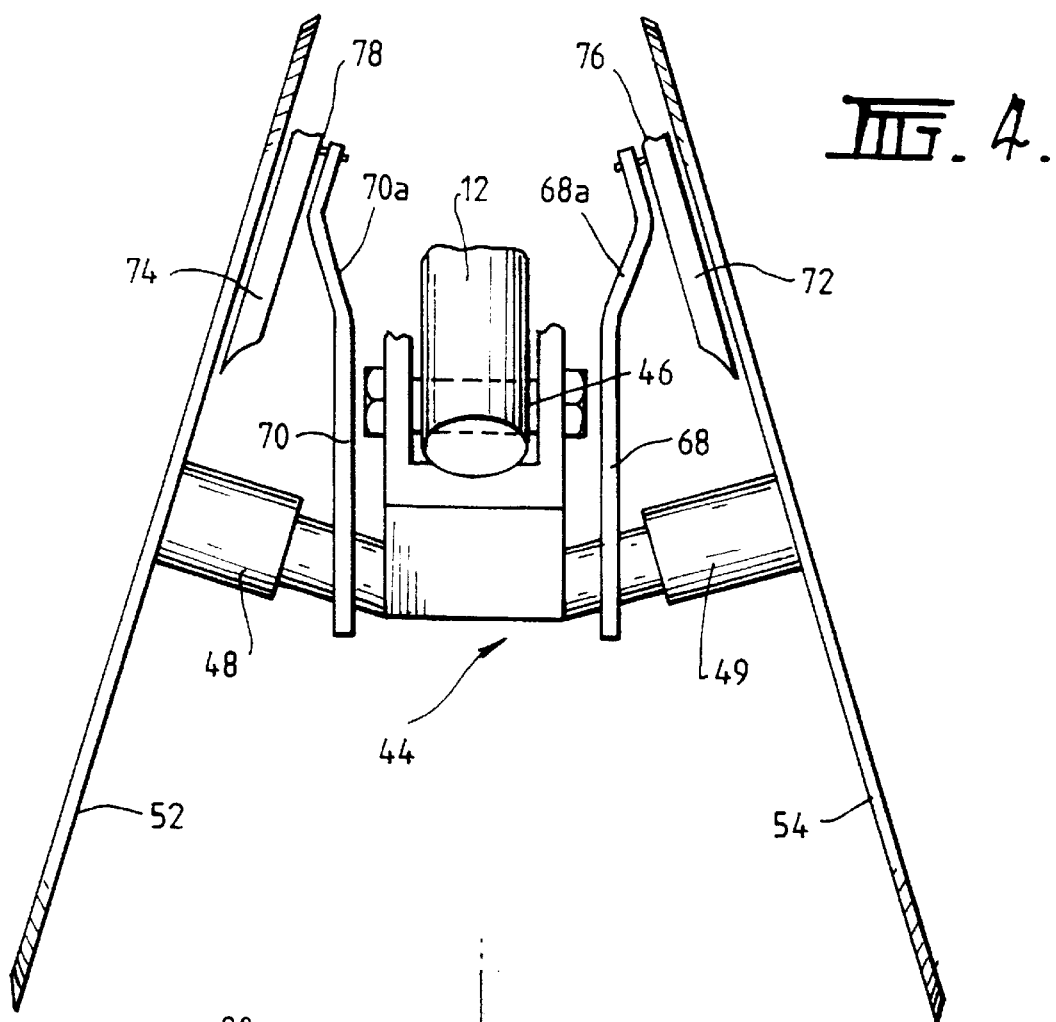
FIG. 4 shows a plan view of FIG. 3.

FIG. 4 is a top view of the front portion of the apparatus in accordance with the present invention, with further detail added to show the positioning and mounting of the seed tubes. In particular, the apparatus further includes rearwardly extending arms 68, 70, which arms include angled portions 68*a*, 70*a* respectively. Pivotally mounted to the rearmost part of arm portion 68(*a*), 70(*a*) are seed tubes 72, 74. While only two tubes for seeds and other beneficial are shown, any number of tubes may be used. The supply tubes 72, 74 are oriented such that they always lie parallel to the plane of the coulters. Moreover, by pivotally mounting the seed tubes 72, 74 (at pivot points 76, 78), adjustment of the position of the outlet of the supply tubes can be effected.

Figure 5:
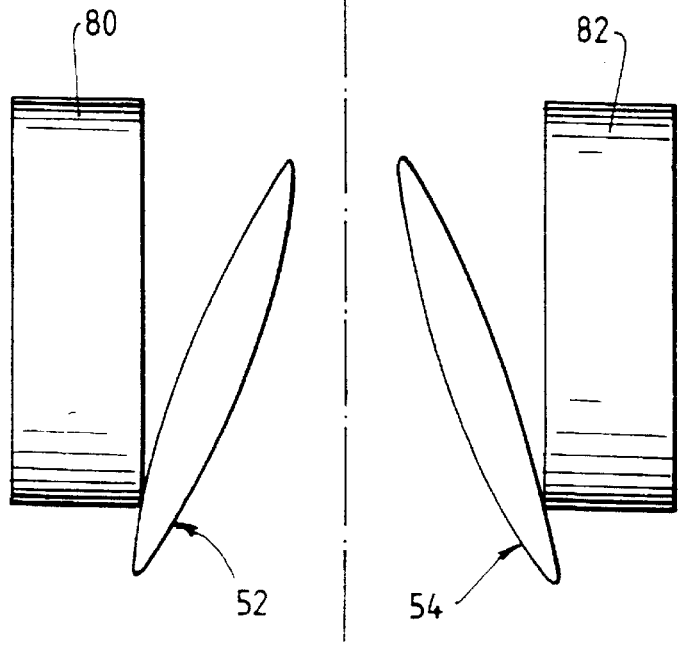
FIG. 5 shows a schematic front elevation of the apparatus of FIG. 1 showing the spatial relationship of the coulters and press wheels. All details of the apparatus, except the coulters and press wheels, have been omitted for clarity.
Figure 6:
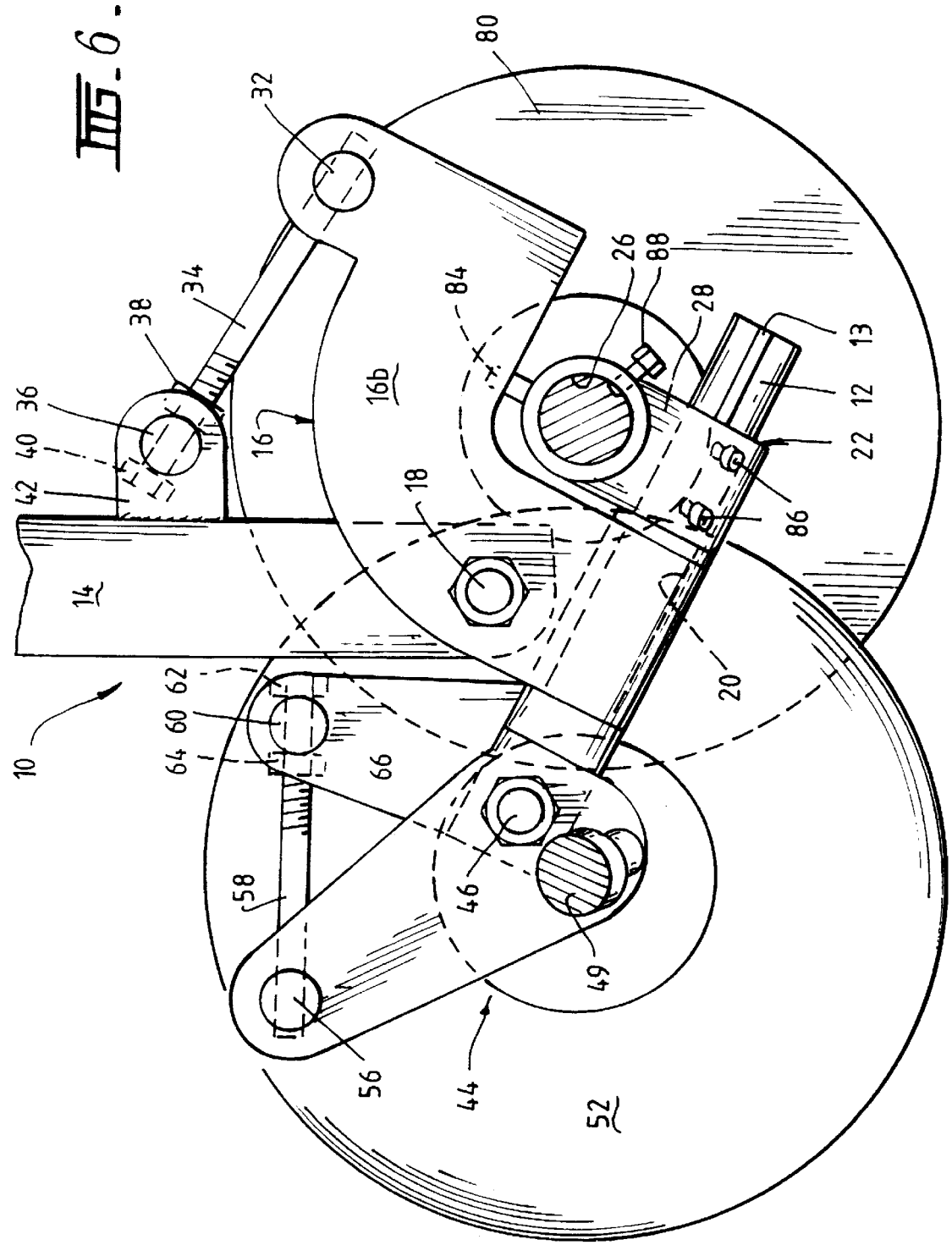
FIG. 6 shows a similar view to FIG. 1 but with the coulters and press wheels included in order to show the side view of the spatial relationship between the coulters and press wheels.

FIG. 5 shows a front schematic view of the apparatus of the present invention (with much detail omitted therefrom) to show the relative arrangement between the coulters and the press wheels. As can be seen from FIG. 5, coulters 52, 54 and press wheels 80, 82 are arranged such that the innermost portion of press wheels 80, 82 overlaps with the outermost portion of coulters 52, 54. It has been found that in order for the press wheel to fulfil its above-mentioned functions, only a small overlap between the innermost portion of the press wheels 80, 82 and outer most portions of the coulters 52, 54 is generally required. Furthermore, as can be seen from FIG. 6, press wheel 82 and coulter 54 overlap to a certain degree in the longitudinal direction as well. However, it will be appreciated that coulters 52, 54 do not contact their respective press wheels 80, 82 due to the angling of the coulters 52, 54. It will also be appreciated that the longitudinal positioning of the press wheels 80, 82 may be adjusted as described hereinabove and that in some instances it may be desirable to have no overlap between the coulters and their respective press wheels in the longitudinal direction. The press wheels may also be adjusted inwardly or outwardly to avoid contact with the coulters.

As a general rule, press wheels 80, 82 are preferably much more heavily built than normal press wheels to enable them to absorb the entire downforce applied to each unit if little or no pressure is required on the coulters at any particular time. The press wheels are preferably wider than normal (for example from 100 to 200 mm wide), so that the force per unit area on the press wheels is not excessive. This is of benefit in soils prone to excessive crusting or compaction and flotation of the press wheels on the soil is guaranteed if sowing into conventional cultivation or soft soils.

The press wheels capture the disturbed soil almost immediately after the seed has been planted with little or no soil moving from underneath the press wheels. This leaves an exceptionally level soil surface following seeding. This also provides very little or substantially no mixing of the dry surface soil and the moist subsurface soil. However, the design of the press wheel can be varied depending on the soil and design requirements of the soil working apparatus.

In some circumstances, where deep soil moisture is available to allow germination and establishment of a plant, the relative position of press wheel may be further behind the soil working means. This allows some of the drier top soil to be moved aside creating a furrow along which the trailing press wheel passes. Under these circumstances, a narrow press wheel may be used and the surface of the soil along which the press wheel travels is at the bottom of the furrow. By moving some of the drier top soil to the side in front of the press wheel, the seed can be placed below the new soil surface level which is closer to the soil moisture level without increasing the amount of soil covering the seed. Thus, while the seed is planted deeper and closer to the moisture level, the seedlings are able to emerge through a reduced covering of soil than would normally be the case for seeds planted at that depth.

A narrow press wheel set close to the side and behind the rotatable soil working means may also be advantageous in capturing and closing the disturbed soil in some pasture and crop establishment situations.

Due to the agronomic requirements in differing areas (ie. soil types, rain fall, surface residues and seed-bed requirements) variations in the setting and placement of the rotatable soil working relative to the press wheel will be required. However, in all situations the press wheel will trail behind the soil working means and be beside (ie. travel a path beside the soil working means). Other elements such as coulter and press wheel cleaners, surface residue shields, residue deflectors and cleaners* and soil deflecting, capturing and closing devices, will also need to be repositioned in accordance with the agronomic requirements of the field in which it is to be used.

A further advantageous feature of the present invention is provided by mounting intermediate member 16 onto longitudinal shaft 12 in a fashion that allows longitudinal shaft 12 to rotate through the opening or the sleeve 20 formed in the lower part of intermediate member 16. During use of the machine, it will be appreciated that tine 14 is held in a fixed orientation by the tool carrying assembly that is connected to the tractor or other towing vehicle or implement frame (not shown). If one of the coulters or press wheels encounters an obstacle or uneven ground, that coulter or press wheel can ride up or down over the obstacle or uneven ground, which causes longitudinal shaft 12 to rotate inside opening or sleeve 20 of intermediate member 16. This causes the coulter and press wheel on the opposite side of the sub-unit to rotate in an opposite direction. In effect, the coulters and press wheels can oscillate up and down in a limited arc around the longitudinal axis of the longitudinal shaft. This ensures that each press wheel is always maintained in the desired horizontal relationship with its associated coulter and that the chances of breakage caused by striking an obstacle are reduced.

In order to control the degree of oscillation between said limits, a stop member 84 is mounted to the press wheel beam 22. As the press wheel beam 22 rotates away from a horizontal orientation, the stop member 84 can come into contact with the upwardly extending members 16*a*, 16*b* of intermediate member 16. Once the stop member 84 has contacted upwardly extending arm 16*a* or 16*b*, further oscillation of the press wheel beam is prevented.

It is especially preferred that the apparatus shown in the accompanying drawings is mounted to a tool carrying mechanism having a parallelogram mechanism to allow the apparatus to move up or down in the vertical plane if large obstacles are encountered, thus avoiding breakage. Any such known tool carrying apparatus (of which there are many) will be suitable for this purpose.

The apparatus shown in the accompanying figures may comprise one of a plurality of similar sub-units that are mounted to a tool carrying assembly or a super structure to constitute a planting or soil working apparatus. The sub-units shown in the accompanying drawing are designed to reduce capital costs by allowing larger areas to be planted in the available time. They are also designed to fit into existing parallelogram type tine boxes or as a stand alone unit.

The apparatus of the present invention has been designed to be used at much higher speeds than normal planting speeds. For example, the unit has been trialled at speeds in excess of 20 kilometers per hour, and speeds of up to 40 kilometers per hour may be possible, compared with normal planting speeds of approximately 10 kilometers per hour. This will allow for much higher productivity than existing planters. Alternatively, it may be possible to use narrower planters and attain the same productivity as current wide planters. This will result in a large saving of capital costs on the current wide planters without any loss of productivity. The apparatus of the present invention allows control of soil tilth and width of the tilled (worked) zone by varying the pitch angle of the coulters by use of screw adjustor 58. Each coulter is controlled depth wise by the press wheel beside and behind it and through the controlled oscillation described hereinabove. Effectively, the coulter and its corresponding press wheel are linked so that the horizontal relationship between the coulter and its corresponding press wheel is maintained. Moreover, press wheel height, relative to the bottom of the coulter may be controlled through a large range by use of screw adjustor 34. Please note that both screw adjustor 34 and 58 may be provided with a graduated scale for reference.

It is also noted that the press wheel beam 22 can be moved backwards and forwards along the keyed longitudinal shaft to accommodate varying soil conditions. The press wheel beam 22 is held in position by set screws 84, 86.

The press wheels themselves may be mounted on simple stub axles that are inserted into openings 24, 26 in the press wheel beam 22. Holding screw 88 may be used to hold the press wheel in the desired position. In this arrangement, the press wheels can be moved into and out of the press wheel beam to accommodate the varying widths of the trailing edges of the coulters as they are adjusted.

The use of twin coulters in opposed orientation balances side loads and reduces component wear.

The apparatus of the present invention allows widths to vary, according to coulter pitch adjustment, from a very tiny, extremely shallow worked zone with limited tilth (ideal, for example, for sub-clover seed) to a deep, wide worked zone with considerable tilth (ideal, for example, faba beans). Germination of planted seeds can be enhanced by placing the seeds and/or fertilizer or other beneficial agents on undisturbed soil at the bottom of the furrow for good moisture absorption whilst the emerging roots can easily grow into the nearby disturbed soil that has been tilled or worked by passage of the coulters. Additionally, seed can be placed against the undisturbed soil but adjacent to the disturbed soil either just on the surface or completely buried.

Each of the sub-units may be attached to its tool bar frame or superstructure by a clamp and wedge for very quick adjustment. Such arrangements may do away with the necessity of bolting the sub-units to the tool bar frame or superstructure. However, it will be appreciated that any other means for connecting the sub-unit to the tool bar frame or superstructure may also be used.

In the second embodiment of the present invention shown in FIG. 7, a tyne or upright 121 is fixed to an outer bush 120 which receives an elongate longitudinal shaft 104. Longitudinal shaft 104 is provided with an enlargement 128 at its end thereof and a thrust washer and seal 122 is provided on the longitudinal shaft 104 to seal the outer bush 120 from dust and other contaminants which may effect the rotational movement of the elongate shaft 104 within bush 120.

The sub-unit 100 includes an oblique axle mounting beam 101 having welded thereto oblique axle mounts 105 for receiving coulter axles 106. The coulter axles 106 are received and extend into the mounts at an angle offset from the direction of the longitudinal axis of the mounts 105 and the mounting beam 101. Outer press wheel beam 113 has secured thereto press wheel beam connecting arms 107 provided with apertures 126 in the ends distal to the outer press wheel beam 113 for receiving oblique axle mounts 105 in rotational engagement.

The axles 115 of the press wheels are received within press wheel axle mounts 114 which in turn are received within outer press wheel beam 113 the position of the press wheels relative to the outer press wheel beam 113 may be adjusted by the adjustable engagement of the press wheel axle mounts 114 within outer press wheel beam 113.

Thus the oblique axle mounting beam 101, and oblique axle mounts 105 are able to rotate within the connecting arms 107 to change the orientation of the coulter axles 106 relative to the press wheel beam 113. The rotation and position of the oblique axle mounts 105 relative to the connecting arms 107 and the outer press wheel beam 113 is adjusted by an adjustment means shown as adjusting arm 109 fixed to the oblique axle mounting beam 101 and adjustably received by fixed bracket 112. Fixed bracket 112 is provided with a quadrant arm 111 extending upwardly from the press wheel beam 113 and having a plurality of apertures (not shown) for sliding engagement with the adjusting arm 109. The adjusting arm 109 is provided with a pin or lug 110 which engages the quadrant arm 111 to set the position of the oblique axle mounting beam 101 relative to the press wheel beam 113. By rotating the oblique axle mounting beam 101 relative to the connecting arms 107, the orientation and pitch angle of the coulter relative to the corresponding press wheel varies enabling the distance between the leading edges of the coulters to increase or decrease thereby altering the tilth and contact angle of the coulter with the soil.

The sub-unit may be mounted to a tyne or upright 121 having a bush 120 welded at the base to form a T-shaped member. Journalled with the bush 120 is an elongate longitudinal shaft member 104 which is provided with an enlargement 128 at its end in proximity to the oblique axle mounting beam 101. The oblique axle mounting beam 101 of the sub-unit is provided with mounting plates 103 which engage with enlargement 128 of the elongate shaft 104 allowing rotation of the oblique axle mounting beam 101 about an axis substantially parallel to the longitudinal axis of that beam. The longitudinal shaft 104 may also be provided with a thrust washer and seal 122 to protect the interior of the bush 120 while allowing rotation of the longitudinal shaft 104 in the bush 120.

The height of the press wheels relative to the tyne 121 or upright may also be adjusted by a rear depth adjustment means which alters the position of the bush 120 relative to the press wheel beam 113. The rear depth adjustment means as illustrated in FIG. 9 includes fixed guide plates 117 secured to the press wheel beam 113, a depth adjustment linkage 118 pivotally connected at one end 118a to the elongate shaft 104 journalled within bush 120, and depth adjustment lever 118b. The depth adjustment lever 118b is pivotally connected to fixed guide plates 117 at a fulcrum point 118c and provided with an adjustable engagement means (not shown) fixed to the press wheel beam 113. The adjustment means may include a mounting bracket and upwardly extending quadrant arm which is engaged by a lug or pin associated with the depth adjustment lever 118(b) in a similar manner to the adjustment means which set the rotation and position of the oblique axle mounting beam 101.

By raising depth adjusting lever 118(b), the linkage 118 is moved downwardly by action through the fulcrum point 118(c) and pivotal connection 118(d) causing the position of the longitudinal shaft 104 and hence the tyne to be lowered relative to the press wheels. Similarly lowering the depth adjusting lever 118(b) raises the position of the longitudinal shaft relative to the press wheels. Since the height of the longitudinal shaft above the bottom of the coulters is set, raising or lowering the longitudinal shaft relative to the press wheels respectively decreases or increases the depth of the coulters into the soil.

As with the earlier embodiment shown in FIG. 1 to 6, it is most preferable that a seed supply means be provided with the soil working apparatus of the invention to enable seed or other beneficial agents to be dropped into the momentary void which is created behind the coulter in its passage through the soil. The press wheel positioned partially behind and on the disturbed side of the coulter, catches and controls the disturbed soil as it rises with the trailing edge of the coulter. Once the coulter has passed through a particular part of the soil and the seeds or other beneficial agents dropped into the soil, the press wheel operating synchronously with the coulters pushes the disturbed soil back into void to cover the seed and other beneficial agents and presses the soil down without overpressing or overcompacting the soil.

In a further embodiment of the invention shown in FIGS. 11 to 15, the sub-unit 200 includes oblique mounting sleeve 231 secured to quadrant bodies 230(a) and 230(b) and press wheel beam 244 secured to press wheel arms 240(a) and 240(b). Axle or axles of at least one soil working means are received in oblique axle mount 232 which is provided with an adjusting arm 233 adapted to releasably engage one of the quadrant bodies 230(b). The releasable engagement between the adjusting arm 233 and quadrant body 230(b) is provided by a plurality of engagement apertures 235 formed in the quadrant body 230(b) or 230(a) adapted to receive locating lugs 234 on the adjusting arm 233.

The press wheel arms 240(a), 240(b) are pivotally mounted to the respective quadrant bodies 230(a), 230(b) by an engaging pin 246 which passes through apertures 241, 239 in the respective press wheel arms and quadrant bodies. The relative position of the press wheel arms 240(a), 240(b) to the respective quadrant bodies 230(a), 230(b) is releasably secured by locator tabs 243 provided on the press wheel arms 240(a), 240(b) which slides within slots 245 and engage with teeth 242 formed in the respective quadrant bodies.

By varying the position of the adjusting arm on the quadrant body, the oblique axle mount 232 is able to be rotated within sleeve 231. Since the straight axle or axles of the soil working means such as coulters or discs are received within the mounting 232 so that the axis of rotation of each soil working means is offset at an angle to the axis of rotation of the mounting 232, the angle of the soil working means relative to the soil can be changed as can the distance between the forward most edges of the soil working means when two soil working means are used.

Furthermore by releasing the locator tabs 243 from engagement with teeth 242, the position of the press wheel sleeve 244 relative to the oblique axle mounting sleeve 231 can be raised or lowered. Since the press wheels are always in contact with the ground in use, raising or lowering the oblique axis mounting sleeve 231 relative to the press wheel mounting sleeve 244, effectively decreases or increases the depth to which the soil working means passes through the soil. To connect the sub-unit of this embodiment to a tyne or upright, forward connecting plate 236 and rear connecting plate 237 are secured to and extend between quadrant bodies 230(a), 230(b). The tyne or upright 221 is provided with a bush 220 to form a T-shaped member which is positioned between the forward and rear connecting plates 236, 237. An elongate longitudinal shaft 204 extends through an aperture in the rear connecting plate through the bush 220 to engage an aperture in the forward connecting plate 236. It is preferable that the longitudinal shaft 204 is permitted some limited rotational movement with the bush 220 to allow the sub-unit to rotate to accommodate variations in the soil surface.

The above described sub-unit enables the angle and space between the forward most edges of the coulters to be varied when two coulters are used as well as enabling the tilth or depth of the coulters as they pass through the soil to be varied.

FIG. 16 shows a fourth embodiment of the invention which is similar to the previous embodiment of FIG. 11. The embodiment of FIG. 16 is specifically designed to operate a single coulter or soil working means in conjunction with the press wheel. In this embodiment the sub-unit includes press wheel mounting beam 344 having connecting arms 340(a) and 340(b) secured thereto. The coulter mounting beam 331 receives oblique axle mounting 332 which have fixed thereto a quadrant body 330 similar to that shown in FIG. 15 as 230. In this embodiment the tyne or upright 321 is secured directly to the oblique mounting sleeve 331. The angle of the coulter axles 306 within the oblique axle mounting sleeve 331 may be varied by rotating adjusting arm 333 which is identical to adjusting arm 233 shown in FIG. 15 and releasably engaging lugs 334 with apertures 335 formed in the quadrant 330. To adjust the height of the coulter mounting sleeve relative to the press wheel sleeve, press wheel connecting arms 340 are pivotally mounted to quadrant body 330 by pivot pin 346 to enable the depth of the coulter to be varied.

FIG. 10 illustrates an example of a parallelogram arrangement which allows a sub-unit of any one of the preferred embodiments to be mounted to a tool carrying assembly such as a tractor tool bar. This figure illustrates a means whereby the soil working apparatus of the invention may be completed by mounting the sub-unit of any one of the preferred embodiments to a superstructure which allows transverse movement in upwards and downwards direction to accommodate variations in the soil without effecting the performance of the invention. The superstructure 50 includes linkages 51, 53 connected directly or indirectly to the tyne or upright 21 (which may also be tyne or upright 121, 221 321, formed into a parallelogram arrangement. Upright connection 57 joins linkages 51,53 and is welded to a clamp which, in turn is attached to the frame. The upright connection 57 fixed parallel to the tyne 21 has a damping means such as a spring 59 secured thereto preferably so that the axis of the spring is substantially parallel with the longitudinal axis of the connection 57. With one end of the biasing means 59 secured to a support plate on the connection 57, the other end of the biasing means is secured to linkage 53 which at rest is substantially perpendicular to connection 57. To secure this superstructure to a tool carrying assembly for a tractor, connection 57 is welded to a clamp which attaches to frame bar 55 (not shown). The frame bar 55 may then be attached to a tractor 3 point linkage or it may be provided with its own wheels.

If the soil working apparatus of the invention includes multiple sub-units, the frame bar 55 can be extended in either direction and similar superstructures attached for each sub-unit.

Embodiments of the invention involving differing arrangements of rotatable soil working means and press wheels are illustrated in FIGS. 17(a) to 17(e).

Figure 17A:
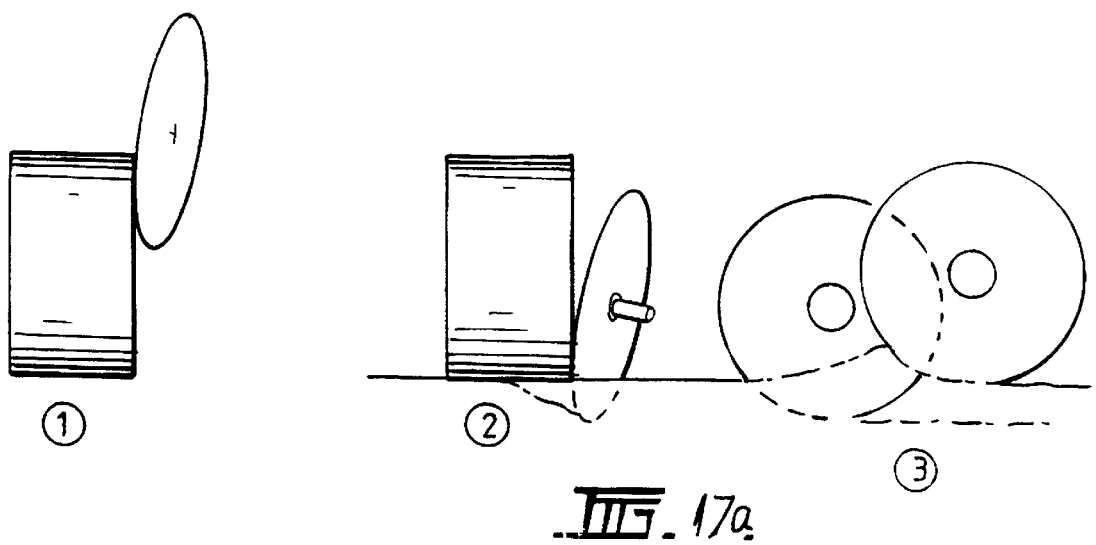

FIGS. 17(a)(1), 17(a)(2) and 17(a)(3) are respectively an overhead view, a rear view and a left side view of a single coulter in which a single press wheel is positioned behind and beside the coulter.

Figure 17B:
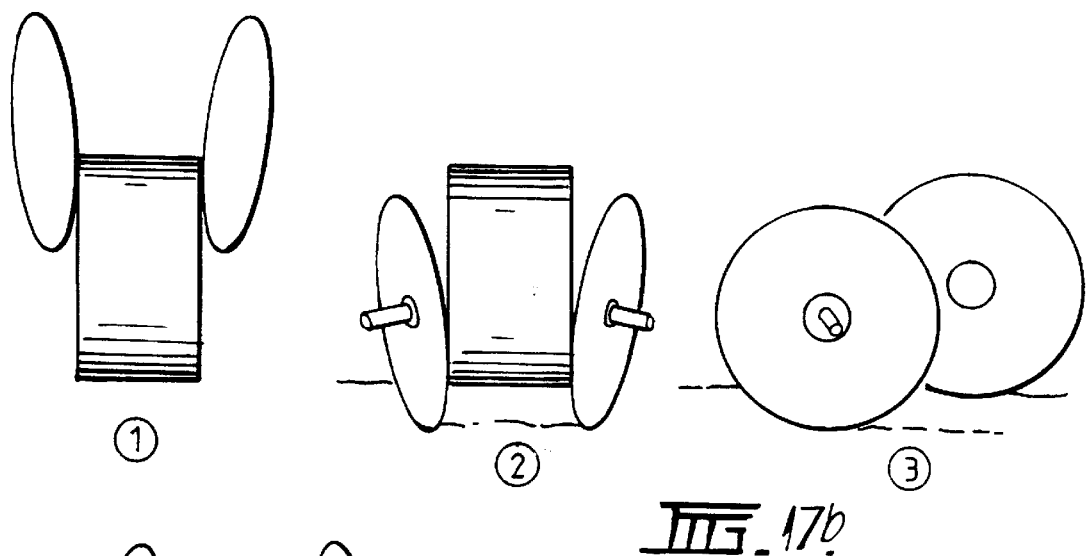

FIGS. 17(b)(1), 17(b)(2) and 17(b)(3) are respectively an overhead view, rear view and left side view of an embodiment of the invention in which a pair of coulters are positioned beside and behind a single press wheel. Each coulter is angled to disturb soil beneath a portion of the soil beneath the surface of the path traversed by the press wheel.

Figure 17C:
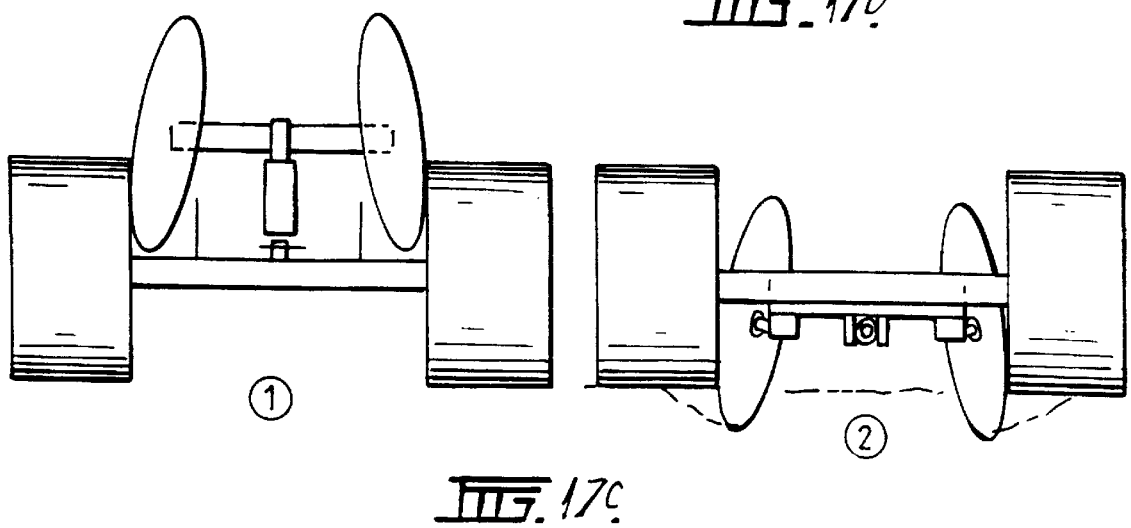

FIG. 17(c)(1) is an overhead view of two opposed coulters cutting outwardly to their respective press wheel. Also illustrated is the central oscillation bush (20, 120, 220) from which the apparatus is pulled. FIG. 17(c)(2) is a rear view of the embodiment of FIG. 17(c)(1) showing opposed coulters which cutting towards the press wheel and are obliquely mounted by their axles to either end of a mounting beam which can rotate. This allows the pitch angle of the coulters to alter simultaneously thus allowing a greater or lesser void beside the coulters in which to place beneficial agents.

FIG. 17(d)(1) is an overhead view of a pair of coulters which cuts toward a single press wheel. This unit is attached along side a similar unit by a main chassis beam or frame bar which can be constructed or lengthened to any desired unit spacing. This combination is given down forcing connected by parallelogram as illustrated in FIG. 10. FIG. 17(d)(2) is a rear view of the embodiment shown in FIG. 17(d)(1).

FIGS. 17(e)(1), 17(e)(2) and 17(e)(3) are respectively a top view, rear view and left side view of a close coulter design in which two opposed coulters are cutting toward their respective press wheels.

FIG. 17(e)(2) also illustrates the central vertical standard or tyne to which the apparatus is attached to a parallelogram arrangement as shown in FIG. 10.

What is claimed is:

1. A soil working apparatus for planting seeds, the apparatus having a sub-unit including at least one rotatable soil working means for disturbing soil in the direction of travel of said apparatus, said at least one rotatable soil working means being oriented for obliquely passing through and beneath the surface of the soil, a sub assembly including a mounting beam mounted for rotation within said sub-unit having at least one oblique axle mounting for receiving an axle of said at least one rotatable soil working means, said axle extending into said mounting beam at an angle offset from the direction of rotation of the longitudinal axis of the mounting beam, and at least one press wheel positioned beside and at least partially behind each of said at least one rotatable soil working means for pressing down the disturbed soil back over any planted seeds, each said at least one press wheel corresponding to at least one of said at least one rotatable soil working means whereby rotation of said oblique axle mounting beam within said sub-unit changes the orientation of said soil working means relative to its respective press wheel and wherein the axis of rotation of said at least one rotatable soil working means is oblique to the axis of rotation of the corresponding press wheel.

2. The soil working apparatus of claim 1 wherein the at least one press wheel traverses a path across the surface of the soil in the direction of travel of said apparatus and the or each said at least one rotatable soil working means disturbs soil beneath at least a portion of the path of the corresponding press wheel.

3. The soil working apparatus according to claim 2 wherein the axis of rotation of said rotatable soil working means is oblique to the axis of rotation of the corresponding press wheel.

4. The soil working apparatus of claim 1 wherein at least two rotatable soil working means are arranged in pairs, each pair of soil working means corresponding to a single press wheel.

5. The soil working apparatus of claim 4 wherein said pairs of rotatable soil working means are arranged in an opposed orientation to the corresponding press wheel, a portion of each soil working means disturbing soil beneath at least a portion of the path of the corresponding press wheel.

6. The soil working apparatus of claim 5 including an adjustment mechanism for rotation of the mounting beam to vary the tilth and width of the disturbed soil.

7. The soil working apparatus of claim 5 further comprising a supply means having a outlet located a short distance above the level of soil, disturbed by the rotatable soil working apparatus.

8. The soil working apparatus of claim 5 wherein the passage of the rotatable soil working means creates a momentary void in the soil, said apparatus including a supply means having outlets which extends into said void.

9. The soil working apparatus of claim 5 wherein the rotatable soil working means are discs or coulters the axis of rotation of said.discs or coulters being at an angle to the vertical plane and the direction of travel of the press wheel.

10. The soil working apparatus of claim 1 including an adjustment mechanism for rotation of the mounting beam to vary the tilth and width of the disturbed soil.

11. The soil working apparatus of claim 10 wherein the tilth and width of the disturbed soil is varied by adjustment of the depth and angle of the rotatable soil working means relative to the press wheel.

12. The soil working apparatus of claim 11 including a height adjustment means for adjusting the height of the soil working means relative to the press wheel to adjust the depth which the soil working means extends into the soil.

13. The soil working apparatus of claim 11 further including height adjustment means for adjusting the height the sub-unit relative to the press wheel, the relative height of the sub-unit varying the depth which the soil working means extend into the soil.

14. The soil working apparatus of claim 10 including a height adjustment means for adjusting the height of the at least one rotatable soil working means relative to the at least one press wheel to adjust the depth which the soil working means extends into the soil.

15. The soil working apparatus of claim 10 wherein the adjustment mechanism adjusts the axis of rotation of the at least one rotatable soil working means relative to the at least one press wheel.

16. The soil working apparatus of claim 10 further including height adjustment means for adjusting the height of the sub-unit relative to the at least one press wheel, the relative height of the sub-unit varying the depth which the soil working means extend into the soil.

17. The soil working apparatus of claim 1 wherein each sub-unit includes a press wheel and the corresponding rotatable soil working means.

18. The soil working apparatus of claim 1 wherein the sub-unit further includes a connection means for connecting said apparatus to a super structure or a tool carrying assembly.

19. The soil working apparatus of claim 1 further comprising a supply means having a outlet located a short distance above the level of soil, disturbed by the rotatable soil working apparatus.

20. The soil working apparatus of claim 1 wherein the passage of the rotatable soil working means creates a momentary void in the soil, said apparatus including a supply means having outlets which extends into said void.

21. The soil working apparatus of claim 1 wherein the rotatable soil working means are discs or coulters the axis of rotation of said discs or coulters being at an angle to the vertical plane and the direction of travel of the press wheel.

22. The soil working apparatus of claim 21 wherein rotation of the axle mounts of the rotatable soil working means changes the angle of rotation of the soil working means changing the angle of rotation of the soil working means relative to the vertical plane and the direction of travel of the press wheel.

23. The soil working apparatus of claim 1 wherein the sub-unit rotates in a plane transverse to the direction of travel of the apparatus to enable the rotatable soil working means and the press wheels to move generally upwardly and downwardly.

* * * * *